May 9, 1967  J. T. PERRY ETAL  3,319,136
RECTIFIER
Filed Sept. 8, 1964

JOHN T. PERRY
ROBERT M. COONEY
INVENTOR
BY
BUCKHORN, BLORE, KLARQUIST & SPARKMAN
ATTORNEYS

United States Patent Office 3,319,136
Patented May 9, 1967

3,319,136
RECTIFIER
John T. Perry, Melrose Park, and Robert M. Cooney, Chicago, Ill., assignors to Dunlee Corporation, Bellwood, Ill., a corporation of Illinois
Filed Sept. 8, 1964, Ser. No. 394,739
5 Claims. (Cl. 317—234)

The present invention relates to rectifiers, and more particularly to a rectifier utilizing semi-conductor elements.

A particular object of the present invention is to provide a rectifier of small physical dimension, but yet capable of operating at elevated voltages, that is, 75 to 150 kilovolts, and having current carrying capacity of the order of 50 milliamperes continuous current or 1 ampere intermittent load.

Various arrangements for utilizing semi-conductors in high voltage rectifiers have been proposed heretofore, but difficulties have been encountered in providing rectifiers that will successfully operate under conditions such as indicated above. A particular problem has been encountered in dividing the voltage to prevent overloading and breakdown of any one of the rectifying elements in series, such failure thus reducing the overall voltage which the series arrangements will withstand. A breakdown of any one rectifying element when the rectifier is in use frequently causes an avalanche and complete destruction of a rectifier. In some instance, complicated parallel circuit arrangements have been provided to divide the voltage between the rectifying elements in series, but such arrangements are generally undesirable and particularly from the standpoint of bulkiness.

It is, therefore, an object of the invention to provide a rectifier utilizing semi-conductor elements for rectification and wherein the physical dimensions of a rectifier are compact but yet satisfactory voltage dividing is attained.

Still another object of the invention is to provide a rectifier of the type indicated wherein heat generated in the rectifying elements is quickly and harmlessly dissipated.

Still other objects and advantages of the invention will become more apparent hereinafter.

In accordance with an illustrated embodiment, the rectifier of the present invention comprises an elongated tubular housing of insulating material provided with electrical terminal means at each of the opposite ends thereof. Between the terminals, there is arranged a stack of silicon semi-conductor elements of the P-N type which are interposed between large disc-like spacer elements, the semi-conductor elements and the spacer elements being so arranged that each semi-conductor element is in physical contact with at least one of such spacer elements. The housing is completely filled with a liquid dielectric. The spacer elements act as capacitance dividers distributing the voltage applied to the terminals evenly between the rectifying elements so as to prevent any of such elements from exceeding its rated voltage. Such spacer elements also act as heat sinks and absorb any heat generated in the rectifier elements and dissipate such heat to the liquid dielectric which in turn conducts the same to the terminals at the opposite ends for radiation and dissipation.

The invention will now be described in greater detail with reference to the drawings wherein.

Figure 1:
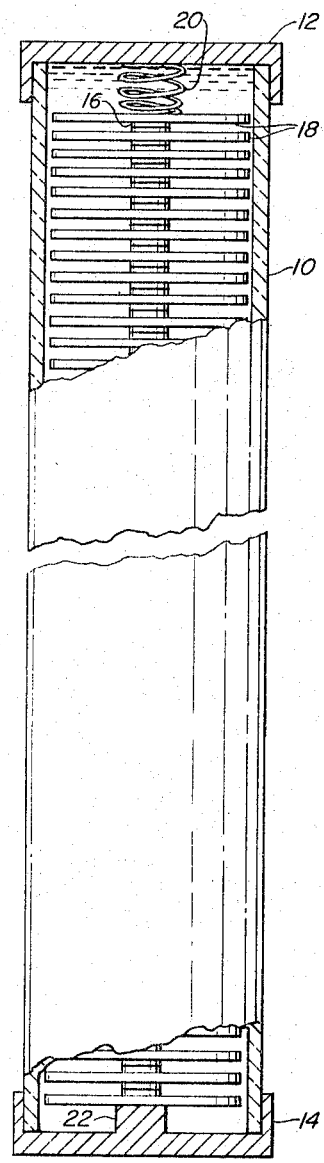
FIG. 1 is an elevation partly in section of a rectifier made in accordance with the invention.
Figure 2:
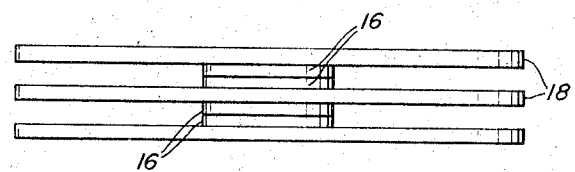
FIG. 2 is an enlarged view of a fragmetary portion of the rectifier shown in FIG. 1.

Referring first to FIG. 1, the illustrated rectifier comprises an elongated tubular housing 10 formed of a suitable ceramic or other suitable insulating material. Secured to the opposite ends of the housing 10 in any suitable manner are end caps 12, 14 defining terminal means for the rectifier. Stacked within the housing between the terminals 12, 14 and in electrical contact therewith are a plurality of rectifier diodes or cells 16 which are preferably silicon semi-conductors comprising silicon doped with phosphorous or arsenides or the like to provide P-N junctions. The cells 16 are in the form of plane surfaced discs having in one embodiment of the invention a diameter of about 0.070 inch and a thickness of about 0.010 inch. The cells 16 are interposed between disc-like washer or spacer elements 18 which have a diameter at least several times that of the diodes 16, and are also provided with opposite parallel, plane surfaces. The washers 18 may, for example, have a diameter of about 0.50 inch and a thickness of about 0.017 inch when used in association with cells 16 of the dimensions indicated above. As most clearly indicated in FIG. 2, the cells 16 are arranged in pairs with a spacer element 18 between each adjacent pair of the cells whereby each cell is in contact with at least one spacer element 18. In the embodiment of FIG. 1, the cells 16 and spacer elements 18 are not bonded to each other, but simply are held mechanically in place by reason of the friction between the various elements. To provide sufficient pressure between the elements to maintain the same in position and also to provide an electrical contact between terminal 12 and the adjacent end of the stack, a coil spring 20 is provided between such terminal and the spacer element 18 at such end of the stack. The terminal 14 is provided with an integral post 22 which engages the lowermost spacer element 18.

The spacer elements 18 preferably are formed of lead, copper or other similar soft metal so that such spacer elements may deform as necessary to meet any surface irregularities in the cell 16 in contact therewith, thus to provide better electrical contact and better heat conduction between the cells and the spacer elements. The housing 10 is filled with a suitable dielectric fluid, such as, for example, a silicone fluid of the type used for this purpose.

As will be apparent, the spacer elements 18 act as capacitance dividers; a typical rectifier of the type described will have a capacitance of about $6 \times 10^{-12}$ farads between adjacent spacer elements. The dielectric fluid 22 helps to dissipate the heat generated in the cells 16 by facilitating the distribution of the heat over each spacer element, as well as distributing it from plate to plate and dissipating it to the outside. Some of the heat will radiate through the ceramic walls of the housing 10, but most of the heat is conducted to the end terminals 12, 14 which act as heat radiators.

Figure 3:
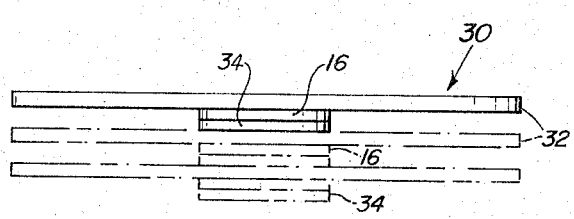
FIG. 3 is an enlarged view showing a preferred arrangement of the rectifying elements and washers incorporated in the rectifier of the invention.

Referring now to FIG. 3, there is therein illustrated a preferred module of a semi-conductor diode and spacer element for use in a rectifier of the invention. Such module indicated generally at 30 comprises a plane surfaced diode 16 positioned between a spacer element 32 having a diameter several times that of the diode 16 and a protecting washer 34 which has a diameter at least that of the diode 16, and which diameter may be slightly greater. In this instance, the spacer element 32 and protective washer 34 preferably are formed of Kovar metal or copper or silver and each is soft soldered to the adjacent surface of the diode 16, the spacer element and washer both being provided with flat, parallel faces. As indicated in dotted lines, such modules are arranged in a stack within the housing of a rectifier similar to the previously described embodiment. The arrangement of FIG. 3 is preferred because of the protection afforded the silicon diode 16 by the spacer element and the washer 34. It is possible that in loading the arrangement shown in FIG. 1 within the housing 10 or during use some shifting of the diodes which are adjacent each other might take place with consequent injury thereto and a possible change in their rectifying characteristics. In utilizing modules, such as shown in FIG. 3, the possibility of such damage is precluded, but the other advantages of the invention are present.

Figure 4:
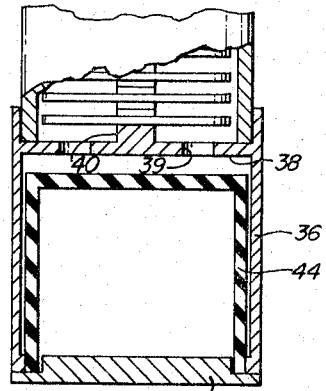
FIG. 4 is a enlarged fragmentary view of the end portion of a modified form of the invention.

To compensate for the volumetric change in the liquid dielectric when the same undergoes substantial temperature changes in operation of the device, an expansion chamber may be incorporated such as that shown in the modification of FIG. 4. In such modification the housing 10 is secured to a tubular end portion 36 formed of metal and having a wall 38 formed with an integral post 40 against which the lowermost spacer element is pressed. The wall 38 is formed with openings 39 to permit the dielectric liquid to flow into and out of the end portion. The end portion 36 is closed with a cap 42. Sealed to the cap 42 and contained within the end portion 36 is a flexible cup-like diaphragm 44 which may be formed of rubber as shown, or which may be of the familiar corrugated metal type, or other suitable material. The diaphragm 44 is gas filled whereby as the liquid dielectric heats and expands the diaphragm collapses to provide space for the expanding liquid.

The diodes 16 preferably are of the so-called "Zener" type exhibiting a relatively sharp knee in the reverse current curve. With such diodes the voltage distribution between diodes is substantially uniform upon the application of a high voltage to a series thereof, thus minimizing the possibility of breakdown.

Having illustrated and described a preferred embodiment of the invention, it should be apparent to those skilled in the art that it permits of modification in arrangement and detail. We claim all such modifications as come within the scope of the appended claims.

We claim:
1. A rectifier comprising:
    an elongate tubular housing of insulating material,
    electrical terminal means on each of the opposite ends of said housing,
    a plurality of disc-like silicon diodes disposed inside said tubular metal housing, said diodes each having a diameter greater than their axial dimension and having opposite parallel plane faces,
    a plurality of flat disc-like metal spacer elements also disposed inside said tubular housing, and having opposite parallel plane faces,
    said spacer elements having a diameter at least five times greater than that of said diodes,
    said diodes and spacer elements being arranged substantially coaxially of each other and urged toward one another in a stack between said terminal means,
    said diodes being arranged in pairs with one of said spacer elements between each said pair wherein said diodes and said spacer elements mutually support one another, said spacer elements defining substantially uniform closely spaced gaps between said spacer elements outside the diameter of said diodes for providing substantial capacitance and establishing voltage divider action between successive spacer elements and the diodes to which they connect from one terminal means to the other terminal means,
    and a liquid dielectric filling said housing and forming the dielectric between said spacer elements.
2. A rectifier as set forth in claim 1 wherein said diodes are each of the "Zener" type.
3. A rectifier as set forth in claim 1 including means defining a flexible walled gas-filled enclosed chamber in said housing to compensate for expansion and contraction of said liquid dielectric.
4. A rectifier comprising:
    an elongate tubular housing of dielectric material,
    electrical terminal means on each of the opposite ends of said housing,
    a plurality of modules stacked within series in said housing, each said module comprising,
    a silicon diode comprising a disc-like body having opposite parallel planar surfaces,
    a first planar metal disc of a diameter at least several times that of said diode body soldered to one surface of said body coaxially therewith,
    and a second planar metal disc of a diameter at least several times its own thickness and at least equal in diameter to that of said diode body soldered to the other surface of said body coaxially therewith,
    means electrically connecting said stack of modules with said terminal means,
    and a liquid dielectric filling said housing,
    the first metal discs of said modules defining narrow gaps therebetween outside the diameter of said diodes for providing substantial capacitance therebetween and establishing voltage divider action between spacer elements from one terminal means to the other terminal means.
5. A module for use in a high voltage rectifier, said module comprising:
    a silicon diode comprising a disc-like body having opposite parallel planar surfaces,
    a first planar metal disc of a diameter at least several times that of said diode body soldered to one surface of said body coaxially therewith,
    a second planar metal disc of a diameter larger than its own thickness and at least equal in diameter to that of said diode body soldered to the other surface of said body coaxially therewith.

References Cited by the Examiner

UNITED STATES PATENTS

| 2,436,958 | 3/1948 | Eisenberg | 200—168 |
| 2,668,262 | 2/1954 | Dunlap | 317—234 |
| 2,702,360 | 2/1955 | Giacoletto | 317—234 |
| 2,918,612 | 12/1959 | Parrish | 317—234 |
| 2,922,091 | 1/1960 | Parrish et al. | 317—234 |
| 3,047,780 | 7/1962 | Metz | 317—234 |
| 3,264,531 | 8/1966 | Dickson | 317—234 |

FOREIGN PATENTS

| 245,912 | 7/1963 | Australia. |
| 883,862 | 12/1961 | Great Britain. |
| 922,836 | 4/1963 | Great Britain. |
| 965,289 | 7/1964 | Great Britain. |

JOHN W. HUCKERT, Primary Examiner.

A. M. LESNIAK, Assistant Examiner.

UNITED STATES PATENT OFFICE
CERTIFICATE OF CORRECTION

Patent No. 3,319,136                                          May 9, 1967

John T. Perry et al.

It is hereby certified that error appears in the above numbered patent requiring correction and that the said Letters Patent should read as corrected below.

Column 4, line 15, for "within" read -- in --; same line 15, for "in" read -- within --.

Signed and sealed this 29th day of October 1968.

(SEAL)
Attest:

Edward M. Fletcher, Jr.                          EDWARD J. BRENNER
Attesting Officer                                  Commissioner of Patents